Dec. 29, 1931.  W. E. SLOAN  1,838,198
PLUMBING FIXTURE
Filed March 12, 1928  2 Sheets-Sheet 1

Inventor
William E. Sloan
By Parker & Carton Attys.

Patented Dec. 29, 1931

1,838,198

UNITED STATES PATENT OFFICE

WILLIAM E. SLOAN, OF RIVER FOREST, ILLINOIS

PLUMBING FIXTURE

Application filed March 12, 1928. Serial No. 260,919.

This invention relates to plumbing fixtures and has for its object to provide a new and improved device of this description.

The invention has as a further object to provide a plumbing fixture which will prevent contamination of the water supply associated therewith.

The invention has other objects which are more particularly pointed out in the accompanying description.

Referring now to the drawings, Fig. 1 is a view of one form of device embodying the invention shown in position in connection with the water supply.

Like numerals refer to like parts throughout the several figures.

Figure 2:
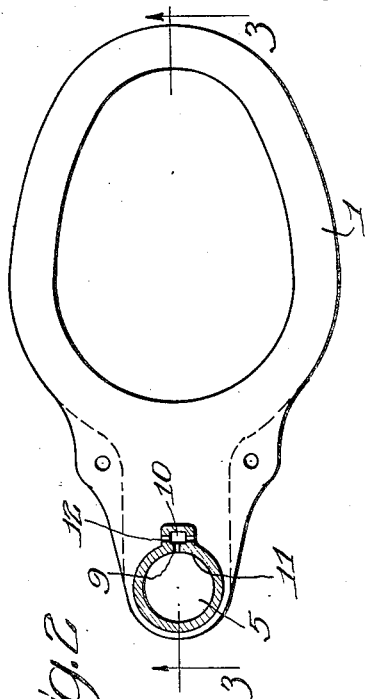
Fig. 2 is a sectional view taken on line 2—2 of Fig. 1.

Referring now to the drawings, I have shown the closet bowl 1 connected by a pipe 2 with a source of water supply 3. This connection is made through some suitable water controlling device such as a valve 4. The bowl is arranged so that if, for any reason, it should become filled, the contaminated water therein cannot find its way back into the source of water supply by back siphonage or the like.

Figure 3:
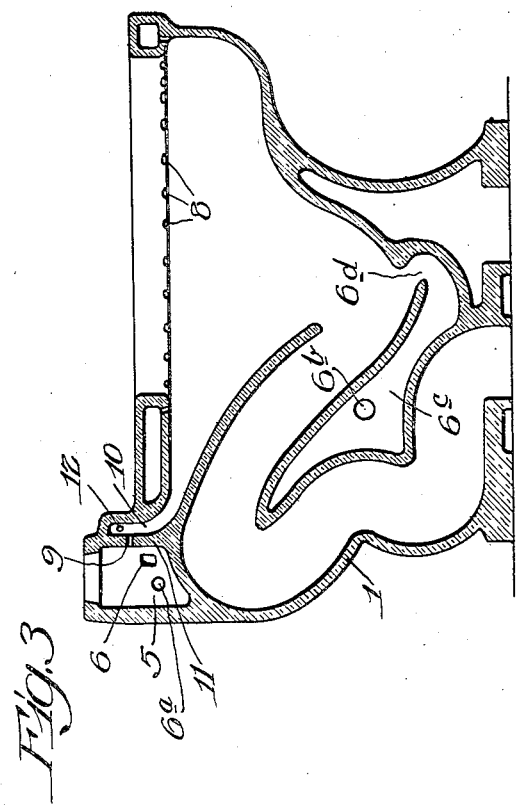
Fig. 3 is a sectional view taken on line 3—3 of Fig. 2.
Figure 1:
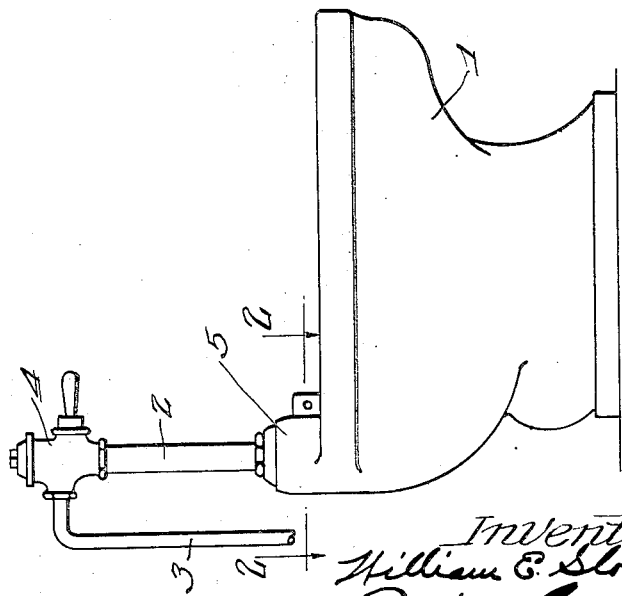

Referring now to the construction shown in Figs. 1 to 3, the bowl 1 is provided with an upstanding water receiving chamber 5 into which the water first passes when the bowl is being flushed. This chamber communicates at each side with the water passageways 6 extending around the top of the bowl. These passageways are provided at intervals with discharge openings 8 by means of which the water is discharged into the bowl. As this construction shows a jet bowl, water also passes from chamber 5 through the passageways 6a and through openings 6b into the jet chamber 6c, the jet passing into the bowl through the jet opening 6d. The chamber 5 is provided with an additional discharge device 9, which discharges water into a compartment 10 which is open at the lower end and through which water is discharged into the middle portion of the bowl.

In this particular construction the compartment 10 is separated from the chamber 5 by the wall 11 and the discharge device 9 is provided by forming a hole or opening in this wall. This hole or opening is above the water level of the bowl when the bowl is entirely filled.

The compartment 10 is provided with one or more openings 12 which communicate with the exterior atmosphere. The opening 12 is located above the discharge device 9 and the opening 12 and discharge device 9 are above the water level in the bowl when the bowl is completely filled. By means of this construction back siphonage is completely prevented for if the bowl is entirely filled, and there should be a suction or back siphonage tending to draw water back into the supply pipe, 3, air will be drawn in through the openings 12 and 9 and the vacuum be broken. It will, therefore, be seen that it will be impossible to draw water from the bowl into the water supply so as to contaminate such water supply.

Figure 4:
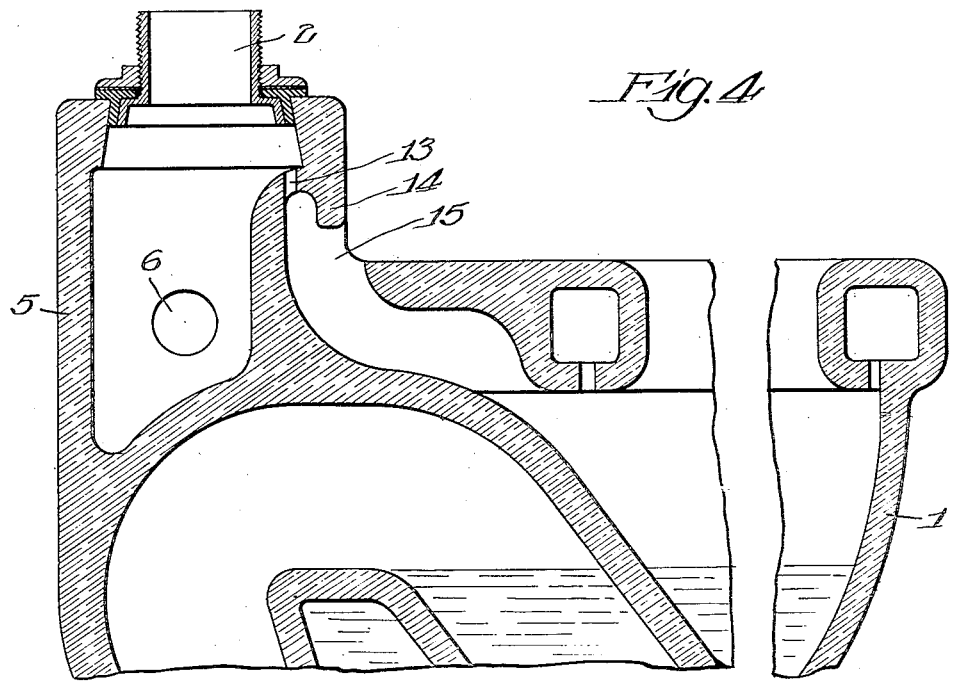
Fig. 4 is a vertical sectional view showing a modified construction.

In the construction shown in Fig. 4, the chamber 5 communicates with the passageways 6 as in the construction of Fig. 1. In Fig. 4 the chamber 5 is provided with a discharge device or opening 13 located above the water line of the bowl 1 when the bowl is completely filled. Opposite the discharge 13 is a directing device 14 which directs water passing through the discharge device 13 and into the bowl. Means is provided for admitting air into the discharge device 13 after the bowl has been flushed.

In the construction shown there is an opening 15 for this purpose, this opening being above the water line of the bowl when the bowl is completely filled. This air space being thus located will always be open so that air can enter the pipe 2 through the discharge device 13 when the bowl is not being flushed.

If there is any tendency to cause a movement of water in a backward direction toward the source of water supply, air will pass through the discharge device 13 and prevent any siphoning action. It will further be seen that in these constructions the discharge devices 9, 10 and 13 through which the air passes to prevent back siphonage, are normally used for the passage of water when the bowl is flushed and these openings are, therefore, kept open in a proper condition to act to let air pass in the reverse direction and thus to prevent back siphonage.

It will further be seen that the water passing through the discharge devices, enters the bowl and acts to assist in the flushing of the bowl. In the construction shown in Fig. 5 there is a discharge device 16 located in the connection between the valve and the bowl. This discharge device is arranged to discharge into the bowl a portion of the water passing through the connection 2. This discharge device is arranged to be at all times above the water level in the bowl even when the bowl is completely filled so that when the bowl is not being flushed, air can pass therethrough into the connection 2 thereby preventing back siphonage from the bowl.

Figure 5:
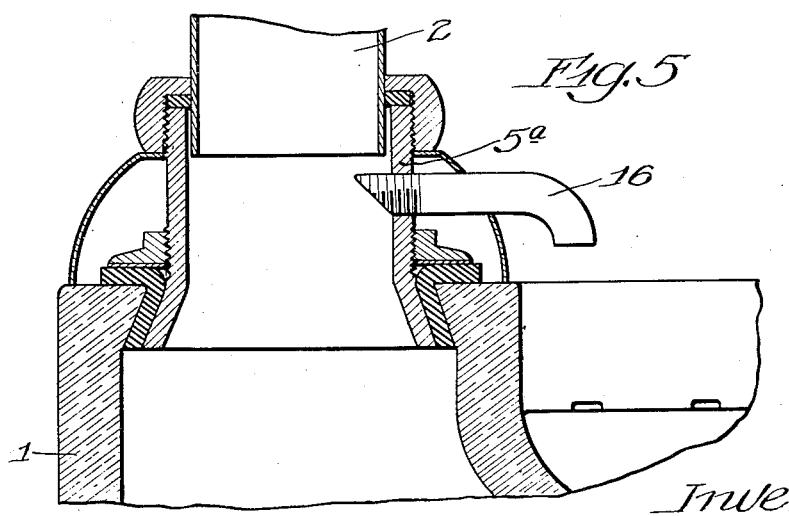
Fig. 5 is a view showing a further modified construction.

In the construction shown in Fig. 5 in order to facilitate the manufacture and assembling of the parts, there is provided a separate chamber 5a which is attached to the bowl in any desired manner and which forms an extension of the pipe 2. The discharge device 16 is shown as a tube open at both ends and extending through the wall of the chamber 5a and arranged to direct the water into the bowl. It will be noted that in all these devices there is a discharge device which normally discharges water when the bowl is flushed there being means for directing the water discharged therefrom into the bowl, the parts being so arranged that air is admitted through this discharge device into the pipe 2 after the bowl has been flushed. It will be seen that in all of the various forms involving the invention, there are two water directing means for directing water to the bowl and that one of these water directing means is constantly open.

I have described in detail a particular construction embodied in the invention but it is, of course evident that the parts may be changed in many particulars without departing from the spirit of the invention as embodied in the claims hereto appended and I, therefore, do not limit myself to the particular construction shown.

The use and operation of my invention are as follows. When the device of Figs. 1, 2, 3, and 4 is used and the bowl is flushed, the water passes from the supply pipe 3 through the valve 4 into the pipe 2 and thence into the chamber 5. Water then passes from the chamber 5 through the passageway 6 around the edge of the bowl and is discharged at different points into said bowl through the openings 8. Water also passes through the discharge devices 9 and 13 into the bowl. It will be seen that at each flush of the bowl some water passes through the discharge devices 9 and 13 so that said discharge devices are kept clear of any obstructing material. If, now, the discharge from the bowl should be clogged so that when the bowl is flushed, and the water fills the bowl, it will be impossible to have any of the water in the bowl drawn back into the supply pipe 3 for if there should be any tendency to produce a back siphoning action, air will pass through the discharge devices 9 and 13 into the pipe 2 and prevent any siphoning action, and any back flow of the water.

In the construction shown in Fig. 5, if the bowl should be filled because of the discharge being clogged, any back siphoning action will be prevented by air passing through the discharge devices 16 into the pipe 2. It will be seen that in both of these ways, since the discharge devices 9, 13 and 16 are above the water level of the bowl when completely filled, no water from the bowl can be drawn through them but air will pass through them to prevent back siphoning action and that these constructions, therefore, absolutely prevent such back siphoning action and make it impossible to contaminate the water supply when plumbing fixtures of this kind are used.

I claim:—

1. A plumbing fixture comprising a bowl, an upstanding water chamber at the rear thereof, means for connecting said chamber with a source of water supply, a connection between said chamber and the bowl through which water flows to flush the bowl, and a discharge device for said chamber through which water passes to the bowl said discharge device being constantly open and being located above the water line of the bowl and in communication with the atmosphere on the exterior of said bowl when said bowl is completely filled and acting to conduct water from said chamber when the bowl is flushed and air back into said chamber after the flush has been completed to prevent back flow from the bowl into the supply pipe.

2. A plumbing fixture comprising a bowl, a water chamber connected therewith adapted to be connected with a source of water supply, a discharge opening in the wall of the chamber for discharging water from the chamber into the bowl when the bowl is flushed, said discharge opening being constantly open and being located above the top of the seat portion of the bowl and in communication with the atmosphere on the exterior of said bowl when the bowl is overflowing and acting to admit air into said chamber after the bowl has been flushed so as to prevent water from passing from the bowl into the source of water supply by a siphoning action.

3. A plumbing fixture comprising a bowl, a connection leading from said bowl to a source of water supply, an auxiliary discharge device in said connection through which a portion of the water passes to the bowl when the bowl is flushed, said auxiliary discharge device being constantly open and being located above the water line of the bowl when the bow is completely filled and in communication with the atmosphere on the exterior of said bowl when the bowl is overflowing and also acting to admit air into said connection after the bowl has been flushed so as to prevent water being drawn from the bowl back into the source of water supply by a siphoning action and a water directing device for directing the water passing through said auxiliary discharge device, into the bowl.

Signed at Chicago, county of Cook and State of Illinois, this 5th day of March 1928.

WILLIAM E. SLOAN.